United States Patent
Kienzle et al.

(10) Patent No.: US 9,085,492 B2
(45) Date of Patent: Jul. 21, 2015

(54) METHOD FOR PRODUCING A CERAMIC SUBSTANCE FOR A CERAMIC MATERIAL

(71) Applicant: SGL CARBON SE, Wiesbaden (DE)

(72) Inventors: Andreas Kienzle, Moettingen Ot Balgheim (DE); Ingrid Kraetschmer, Biberbach (DE); Birgit Reiter, Regensburg (DE)

(73) Assignee: SGL Carbon SE, Wiesbaden (DE)

( * ) Notice: Subject to any disclaimer, the term of this patent is extended or adjusted under 35 U.S.C. 154(b) by 380 days.

(21) Appl. No.: 13/726,781

(22) Filed: Dec. 26, 2012

(65) Prior Publication Data

US 2013/0106010 A1   May 2, 2013

Related U.S. Application Data

(63) Continuation of application No. PCT/EP2011/060734, filed on Jun. 27, 2011.

(30) Foreign Application Priority Data

Jun. 25, 2010  (DE) .......................... 10 2010 030 551
Apr. 20, 2011  (DE) .......................... 10 2011 007 815

(51) Int. Cl.
| | |
|---|---|
| *C04B 35/632* | (2006.01) |
| *B29C 43/16* | (2006.01) |
| *C04B 35/573* | (2006.01) |
| *C04B 35/634* | (2006.01) |
| *C04B 35/83* | (2006.01) |
| *C04B 37/00* | (2006.01) |
| *C01B 31/02* | (2006.01) |

(52) U.S. Cl.
CPC ............ *C04B 35/632* (2013.01); *B29C 43/16* (2013.01); *C01B 31/02* (2013.01); *C04B 35/573* (2013.01); *C04B 35/63476* (2013.01); *C04B 35/83* (2013.01); *C04B 37/005* (2013.01); *C04B 2235/3826* (2013.01); *C04B 2235/428* (2013.01); *C04B 2235/48* (2013.01); *C04B 2235/526* (2013.01); *C04B 2235/5248* (2013.01); *C04B 2235/5436* (2013.01); *C04B 2235/604* (2013.01); *C04B 2235/608* (2013.01); *C04B 2235/612* (2013.01); *C04B 2235/77* (2013.01); *C04B 2235/96* (2013.01); *C04B 2237/083* (2013.01); *C04B 2237/385* (2013.01)

(58) Field of Classification Search
None
See application file for complete search history.

(56) References Cited

U.S. PATENT DOCUMENTS

2005/0037914 A1   2/2005   Gahr et al.

FOREIGN PATENT DOCUMENTS

| | | |
|---|---|---|
| DE | 100 35 111 A1 | 10/2001 |
| EP | 1 008 569 A1 | 6/2000 |
| EP | 1 493 723 A1 | 1/2005 |
| EP | 1 634 860 A2 | 3/2006 |

OTHER PUBLICATIONS

International Search Report of PCT/EP2011/060734.

*Primary Examiner* — Benjamin Schiffman

(74) *Attorney, Agent, or Firm* — Laurence A. Greenberg; Werner H. Stemer; Ralph E. Locher

(57) ABSTRACT

A method for producing a ceramic substance includes producing a homogeneous mixture containing carbon fibers having a fiber length distribution of $D_5 = <15$ μm and at least one powdery and carbonizable binder. The homogeneous mixture is compacted under the action of pressure. The compacted homogeneous mixture is thermally treating for carbonizing, or for carbonizing and graphitizing, to obtain a carbon substance. The carbon substance is siliconized to obtain a ceramic substance.

20 Claims, 12 Drawing Sheets

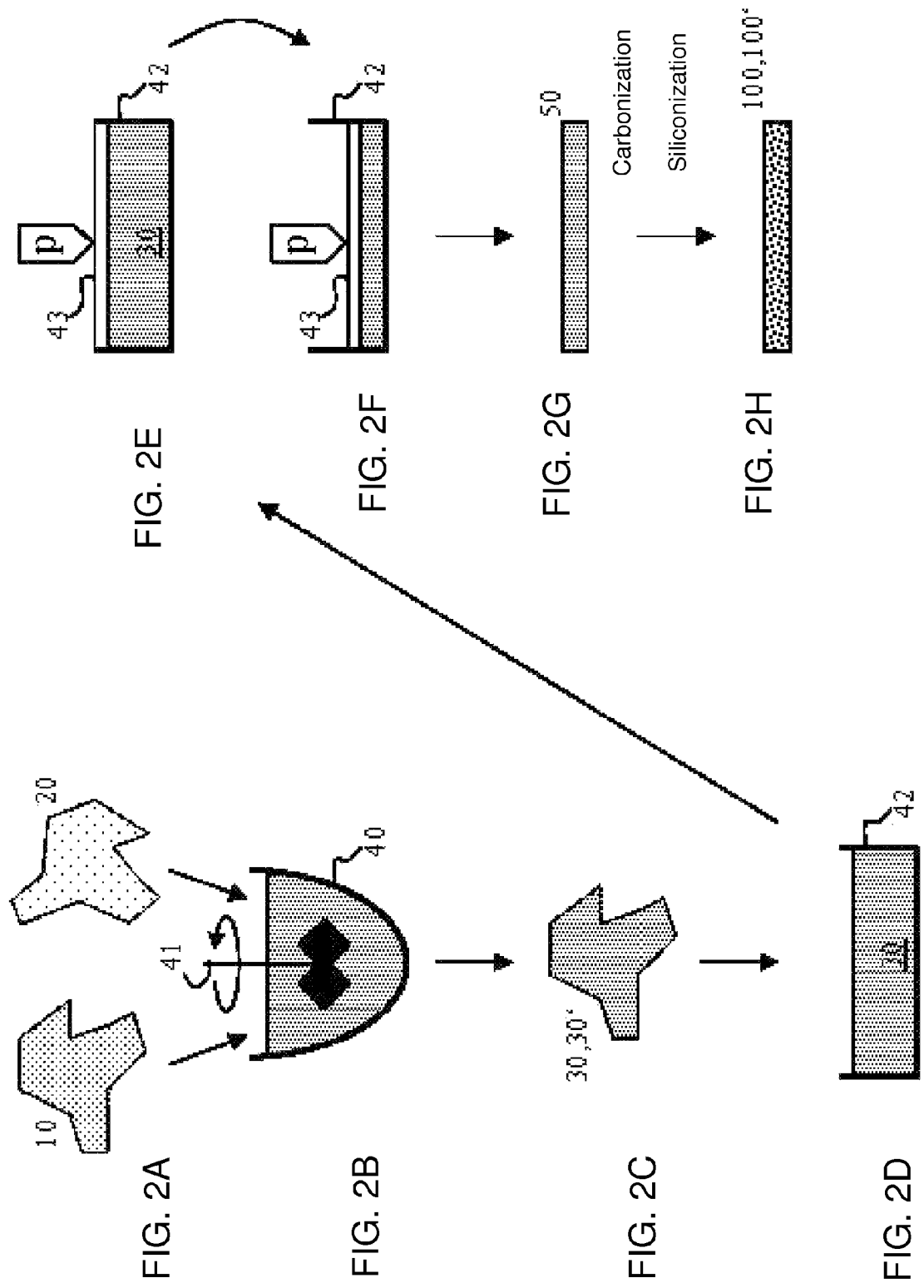

Table 1:
Density of Material Composite
in Dependence on Pressure via Molding

| Pressure p MPa | Density CFK g/cm³ | Density CFC g/cm³ |
|---|---|---|
| 1.0 | 0.61 | 0.58 |
| 1.5 | 0.65 | 0.61 |
| 2.0 | 0.70 | 0.65 |
| 2.5 | 0.73 | 0.69 |
| 3.0 | 0.76 | 0.72 |
| 4.0 | 0.82 | 0.77 |

Fig. 3

Table 2:
Si-Uptake as a Function of the
Density of the CFC Materials

| Density CFC g/cm³ | Si-Uptake % | Si-Uptake % | Si-Uptake % | Si-Uptake % |
|---|---|---|---|---|
| 0.537 | 417.50 | | | |
| 0.568 | | 390.00 | | |
| 0.574 | | | 398.50 | |
| 0.590 | | | | 368.30 |
| 0.601 | | | | 361.60 |
| 0.607 | | | 371.10 | |
| 0.615 | | 354.00 | | |
| 0.616 | 365.90 | | | |
| 0.641 | | | | 339.00 |
| 0.644 | 319.70 | | | |
| 0.646 | | | 346.10 | |
| 0.652 | 342.10 | | | |
| 0.656 | | 330.80 | | |
| 0.656 | | 325.40 | | |
| 0.666 | | | | 312.70 |
| 0.691 | | | 313.10 | |
| 0.695 | | | | 301.70 |
| 0.709 | 295.30 | | | |
| 0.715 | | 298.90 | | |
| 0.716 | | | 303.60 | |
| 0.722 | | | | 285.20 |
| 0.754 | | 275.10 | | |
| 0.766 | 281.00 | | | |
| 0.777 | | | 280.70 | |

Fig. 5

Table 3:
Density of CSiC-Materials
as a Function of the Density of CFC-Materials

| Density CFC g/cm$^3$ | Density CSiC g/cm$^3$ | Density CSiC g/cm$^3$ |
|---|---|---|
| 0.578 | 2.856 | |
| 0.590 | | 2.846 |
| 0.601 | | 2.836 |
| 0.614 | 2.947 | |
| 0.641 | | 2.887 |
| 0.652 | 2.931 | |
| 0.688 | 2.954 | |
| 0.691 | | 2.927 |
| 0.709 | | 2.928 |
| 0.724 | 2.992 | |
| 0.754 | | 2.957 |
| 0.770 | 2.954 | |

Fig. 7

| Density CSiC g/cm³ | Modulus of Elasticity |
|---|---|
| 2.84 | 278.8 |
| 2.86 | 274.6 |
| 2.84 | 277.6 |
| 2.80 | 273.3 |
| 2.85 | 206.6 |
| 2.88 | 292.6 |
| 2.85 | 290.0 |
| 2.88 | 294.0 |
| 2.92 | 305.8 |
| 2.90 | 311.1 |
| 2.91 | 301.0 |
| 2.91 | 311.6 |
| 2.94 | 296.9 |
| 2.92 | 303.7 |
| 2.93 | 321.0 |
| 2.95 | 322.9 |
| 2.94 | 325.8 |
| 2.94 | 324.1 |
| 2.96 | 325.6 |
| 2.96 | 323.0 |
| 2.95 | 328.6 |

Table 4:
Modulus of Elasticity of Material composite as a Function of the Density of CSiC- Materials

Fig. 9

METHOD FOR PRODUCING A CERAMIC SUBSTANCE FOR A CERAMIC MATERIAL

CROSS-REFERENCE TO RELATED APPLICATION

This is a continuation application, under 35 U.S.C. §120, of copending international application No. PCT/EP2011/060734, filed Jun. 27, 2011, which designated the United States; this application also claims the priorities, under 35 U.S.C. §119, of German patent applications No. DE 10 2010 030 551.0, filed Jun. 25, 2010 and DE 10 2011 007 815.0, filed Apr. 20, 2011; the prior applications are herewith incorporated by reference in their entireties.

BACKGROUND OF THE INVENTION

Field of the Invention

The present invention relates to a method for producing a ceramic substance, which is suitable for highly rigid structural components and has a particularly high level of homogeneity in view of the density of the substance components and the other chemical and physical properties.

A ceramic substance has a large number of advantageous physical, in particular mechanical and chemical, properties. Due to these properties, substance compositions and materials of this type can be used advantageously in many technical fields of application.

A problem with existing ceramic substances, however, is that a particularly high level of effort is often necessary to ensure a high level of homogeneity. This is often impossible to achieve satisfactorily, particularly with complex three-dimensional structures.

A high level of homogeneity is necessary, however, in ceramic substances of this type so as to meet high quality requirements.

SUMMARY OF THE INVENTION

The object of the invention is to develop a method for producing a ceramic substance, in which a high level of homogeneity of the ceramic substance and of the other chemical and physical properties can be achieved in a particularly simple and reliable manner.

The present invention is a method for producing ceramic substance. The method more specifically contains the following steps: producing a homogeneous mixture containing carbon fibers having a fiber length distribution $D_{50}<15$ µm and at least one powdery and carbonizable binder, compacting the homogeneous mixture under the action of pressure, thermally treating for carbonizing, or for carbonizing and graphitizing, the compacted homogeneous mixture to obtain a carbon substance, and siliconizing the carbon substance to obtain the ceramic substance.

A particularly high level of homogeneity of the mixture is achieved by intensive mixing with the binder to be supplied.

Fiber length distributions with stringent exclusion dimensions can indeed often be produced, that is to say distributions in which there are no particles of which the diameter exceeds or fails to reach specific limits. However, it is often also sufficient to specify fiber length distributions on the basis of specific D values. The marginal condition that the fiber length distribution has a $D_{50}$ value of less than 15 µm is often sufficient for specific embodiments and fields of application.

The carbon fibers preferably have a fiber length distribution of $D_{95}<30$ µm.

Further advantages in terms of the homogeneity of the ceramic substance to be produced emerge if a number of marginal conditions are imposed within the context of the specification of mutually independent D values. In this case, the specification of the $D_{95}$ value may be considered alternatively or additionally to the specification of the $D_{50}$ value described further above or of other D values.

It is preferable if the powdery binder contains powdery resin, in particular powdery phenolic resin.

The powdery binder preferably has a particle size distribution $D_{50}<100$ µm.

The homogeneity of the ceramic substance to be produced is provided in particular if the described properties for the fiber length distributions are not only required for the starting substance(s), but also for the additions, that is to say in particular for the binder(s).

The mixing ratio in the homogeneous mixture and the pressure during the compacting process, and/or the temperature during the thermal treatment, are preferably selected in such a way that the carbon substance has a density in the range of approximately 0.5 g/cm³ to approximately 0.85 g/cm³.

This may preferably occur on the basis of at least one of the relationships disclosed in Table 2 in FIG. 5 and in Graph 2 in FIG. 6.

During the step of mixing or intensive mixing, one or more additions may be added to form the homogeneous mixed powder, in particular additives and/or fillers.

As a result of the use of suitable binders, additives and/or fillers, the quantity and concentration thereof and incorporation thereof into the structure of the ceramic substance to be produced may contribute to the properties of the ceramic substance to a large extent.

During siliconization, the density of the ceramic substance is preferably set in the range of approximately 2.8 g/cm³ to approximately 3.1 g/cm³.

This may preferably be implemented on the basis of at least one of the relationships disclosed in equation (3)

$$\rho_{sil} = -1.7655 \cdot \frac{\rho^2}{g/cm^3} + 3.1006 \cdot \rho + 1.6223 \cdot g/cm^3, \quad (3)$$

in Table 3 in FIG. 7 and in Graph 3 in FIG. 8.

In this case $\rho_{sil}$ and $\rho$, denote the densities of the siliconized and unsiliconized form of the compacted homogeneous mixture obtained.

As was explained above in detail in conjunction with the shaping, it is also possible to exert control during the process of siliconization via a closed formula expression or to exert control via the empirical values by a graph evaluation or by a table-readout method or table-look-up method.

The density, in particular of the siliconized form, of the obtained ceramic substance may preferably be set directly or indirectly on the basis of at least one of the relationships described in equation (4)

$$\frac{E}{GPa} = 461.79 \cdot \frac{\rho}{g/cm^3} - 1040.4, \quad (4)$$

or disclosed in Table 4 in FIG. 5 or in Graph 4 in FIG. 10.

In this case, E denotes the modulus of elasticity, in particular of the siliconized form, of the obtained ceramic substance or the preliminary product of the ceramic substance.

Even if the modulus of elasticity is controlled, the corresponding possibilities for control are provided during the shaping process or during siliconization.

In addition to the control of the modulus of elasticity, other mechanical properties can also be set accordingly, for example the hardness or the extension and compression behavior, but also thermal or electrical properties, for example thermal expansibility or thermal conductivity, via the shaping process, that is to say ultimately via the pressure conditions, but also via the type of carbonization and/or siliconization and ultimately also via the proportions of the starting substance.

It is preferable if the homogeneous mixture contains 20-50% by weight binder and 50-80% by weight carbon fibers, preferably 30-40% by weight binder and 60-75% by weight carbon fibers.

A compressive force in the range of approximately 1.0 MPa to approximately 4.0 MPa is preferably set during the step of compaction.

During the step of compaction, the homogeneous mixture is preferably molded in a mold to form a compression molding, and the compression molding is converted in the thermal treatment step into a molded article made of the carbon substance.

Processes of dedusting, granulation and/or intermediate storage may be implemented after the step of mixing or intensive mixing and before the step of molding.

A step of carbonizing the obtained compacted homogeneous mixture or the preform of the homogeneous substance composition may occur, in particular by pyrolysis, after the step of molding.

A step of siliconizing the obtained compacted homogeneous mixture may occur after the step of molding and in particular after the step of carbonization.

Due to the process of dedusting, that is to say the removal of particle fractions, the ease of handling of the obtained mixed powder may be increased and a risk of explosion when handling the mixed powder may be reduced. One aspect of the ease of handling is also the reduction of impurities in the working environment as a result of the removal of dusts.

Granulation substantially consists of the formation of mesoscopic particles, clusters or aggregates, for example in the range of some 100 μm to a few mm in substantially solid form, which provide, however, the homogeneous distribution of the starting substances prepared in the mixed powder in a homogeneously mixed manner. A granulate of this type can be stored intermediately, provided the mixed powder as such is suitable therefor, and can be handled, portioned and further processed as required in a particularly suitable manner.

The compression molding is preferably cured before carbonization.

It is preferable if a plurality of molded articles made of carbon substance are produced that are joined together by an adhesive, in particular a carbonizable adhesive, before the step of siliconization to obtain a molded article arrangement.

In a preferred embodiment, the carbonizable adhesive contains resin, in particular phenolic resin and silicon carbide powder.

The silicon carbide powder has a mean particle diameter of 1-50 μm, preferably 3-20 μm, more preferably 5-10 μm.

The carbonizable adhesive contains 5-50% by weight water, 20-80% by weight silicon carbide powder and 10-55% by weight resin, preferably 10-40% by weight water, 30-65% by weight silicon carbide powder and 20-45% by weight resin, more preferably 15-25% by weight water, 45-55% by weight silicon carbide powder and 27-33% by weight resin.

The carbonizable adhesive contains less than 10% by weight, in particular less than 3% by weight, and in particular no, filler made of carbon substance.

The formation of the ceramic substance or of the preliminary product of the ceramic substance may include a step of compression or compression molding and possibly of curing. The obtained mixed powder or its granulate are thus converted by a corresponding shaping process into the ceramic substance according to the invention, wherein a curing process is optionally included. The shaping via a compression process, that is to say via the application of a mechanical pressure, leads to a compaction of the substance distribution already present in the powder or granulate as a homogeneous mixture. Corresponding physical and chemical properties of the finished, demolded homogeneous substance composition can then also be determined, more specifically homogeneously, within wide ranges as a result of the design of the compression process, that is to say as a result of the pressure and/or temperature distributions over time and space.

For example, this may occur on the basis of at least one of the relations disclosed by the following equations (1) and (2)

$$\frac{\rho_1}{\text{g/cm}^3} = -0.0084 \cdot \frac{p^2}{MPa^2} + 0.1126 \cdot \frac{p}{MPa} + 0.5043, \quad (1)$$

$$\frac{\rho_2}{\text{g/cm}^3} = -0.0067 \cdot \frac{p^2}{MPa^2} + 0.0986 \cdot \frac{p}{MPa} + 0.4836, \quad (2)$$

by Table 1 in FIG. 3 and/or by Graph 1 in FIG. 4.

In this case, $\rho_1$, $\rho_2$ denote the density of the obtained ceramic substance or of the preliminary product of the ceramic substance, in particular after carbonization, and p denotes the pressure during the molding step.

The relationships given here, whether describable in closed form or given exclusively empirically, can be configured with shaping processes corresponding to a desired substance density, which result in a desired substance density after the shaping process. The respective desired substance density may optionally also be derived from other physical-chemical relations, such that the pressure parameters that lead to a desired property profile with the homogeneous substance composition according to the invention can be determined in a series of empirical conclusions.

When controlling corresponding methods, the closed mathematical relationships or else the empirical values are provided from graphs or tables, wherein "table-readout methods" or "table-look-up methods" may also be considered.

It is often desirable to carry out specific processing procedures in the carbon substance of the preliminary product of the ceramic substance according to the invention. In particular, this concerns joining processes or else mechanical working by drilling, milling, grinding, planning, since these can be carried out more easily on the carbon substance of the preliminary product of the ceramic substance according to the invention, for example due to the weaker hardness or brittleness in the carbon substance.

A sequence of further conversion processes may directly adjoin the shaping process however, that is to say may directly adjoin the preliminary product inter alia carbonization and/or siliconization, which lead to the structural reshaping already discussed above.

It is particularly preferable if the molded article arrangement is worked by removal of carbon substance from the molded article arrangement before the siliconization step, such that a preform made of carbon substance with a predefined shape is produced.

The preform is preferably carbonized before siliconization.

As a result of this approach, substance properties of the substance composition can be set accordingly, namely with regard to density, the proportion of carbon, silicon and possibly other components, and with regard to the formation and modulation of the structural properties, such that the resilience, strength, hardness, thermal conductivity and other substance properties can be set within wide ranges in a targeted manner and can be adapted to the respective application and use.

In a preferred embodiment, the carbon fibers are produced by grinding and carbonizing viscous and/or cellulose fibers, in particular by first grinding the fibers and then carbonizing said fibers.

In accordance with a further aspect of the present invention, a ceramic substance for a ceramic material is also proposed, in particular for highly rigid structural components or the like, and is, or has been, formed in the above-described manner in accordance with a method according to the present invention.

If it has been molded accordingly within the scope of the shaping process, the ceramic substance according to the invention can be used directly in an application. However, it is also possible to form the ceramic substance in plate form initially, to then join these plates two-dimensionally so as to form an encasing body for a larger three-dimensional structure or a large, extensive flat article, which is then used, possibly following carbonization and/or siliconization, as a basis for the production of a product by working out the correspondingly desired three-dimensional structure or flat form.

Other features which are considered as characteristic for the invention are set forth in the appended claims.

Although the invention is illustrated and described herein as embodied in a method for producing a ceramic substance for a ceramic material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2A-2H are illustrations showing different intermediate stages that are reached with one embodiment of the method for producing a ceramic substance for a ceramic material according to the invention;

FIG. 3 is a table showing how in one embodiment of the method according to the invention for producing a ceramic substance for a ceramic material, the density of a carbon substance according to the invention can be set by pressure during the shaping process;

FIG. 5 is a table showing how an uptake of silicon during the process of siliconization, in one embodiment of the method according to the invention for producing the ceramic substance for the ceramic material, can be controlled via the density of the preliminary product of the ceramic substance;

FIG. 7 is a table showing how in one embodiment of the method according to the invention for producing the ceramic substance for the ceramic material, the density of the ceramic substance according to the invention or of a preliminary product thereof can be controlled, following a process of siliconization, via the density of the unsiliconized form of the carbon substance or of the preliminary product;

FIG. 9 is a table showing how, in one embodiment of the method according to the invention for producing the ceramic substance for the ceramic material, the modulus of elasticity of one embodiment of the ceramic substance according to the invention or of the preliminary product thereof can be controlled via the density of the siliconized form of the carbon substance or the precursor thereof.

DETAILED DESCRIPTION OF THE INVENTION

Figure 1A:
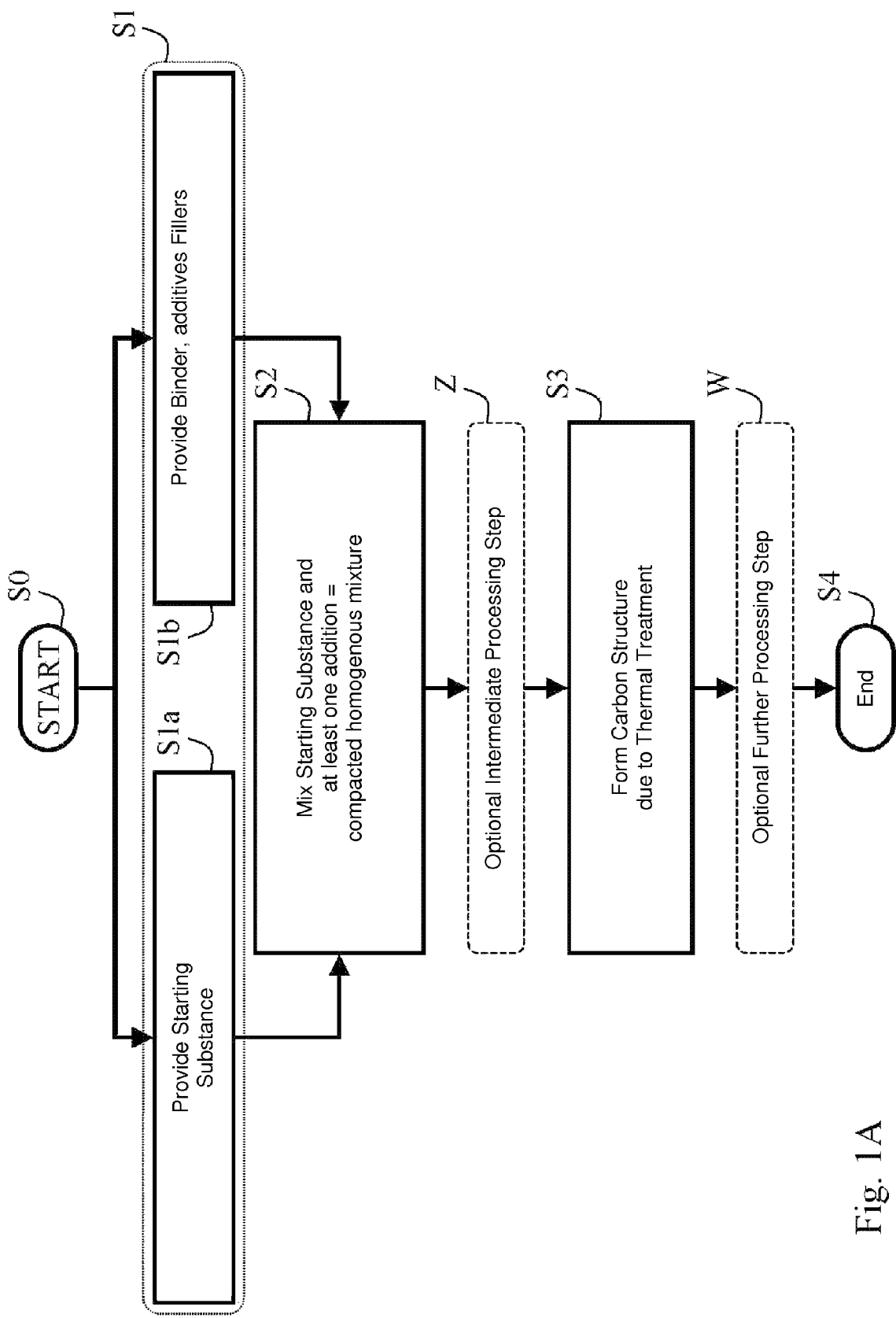
FIGS. 1A-1C are schematic flow diagrams illustrating details of one embodiment of a method for producing a ceramic substance for a ceramic material according to the invention.

Embodiments of the present invention will be described hereinafter. All embodiments of the invention and their technical features and properties can be isolated individually or electively grouped together as desired and combined without restriction.

Structurally and/or functionally like, similar or identically acting features or elements will be denoted hereinafter in conjunction with the figures by like reference signs. A detailed description of these features or elements will not be repeated in each case.

Reference is first made to the drawings in general.

The present invention, inter alia, also relates to a production method for a ceramic substance, which is suitable for the production of highly rigid structural components.

A homogeneous starting substance is required for the production of highly rigid components.

Felt-based substances demonstrate inhomogeneous mechanical properties due to the structuring, namely due to their possible layered structure. With slip-cast SiSiC components, only low or thin wall thicknesses can be produced. Components having thicker wall thicknesses or thicker components establish relatively steep temperature gradients upon heating and cooling, which may lead to destruction of the component. Wood-based ceramics have a high shrink value of up to 70% in the production process and are therefore unsuitable as starting substance for complex geometries.

In accordance with the invention, it is therefore proposed for the production of a very homogeneous ceramic component to use homogeneous fine powder as a raw substance for a mixture with a binder, for example in the form of a phenolic resin powder. The starting components are mixed homogeneously in an intensive mixer and are then compressed to form plates for example.

To be able to process and handle the provided mixture of the starting components, these may be granulated and/or dedusted.

The substance densities of the compressed plates influence the subsequent substance properties from a chemical and physical, and in particular mechanical, point of view. All physical and chemical properties can thus be controlled, in part, by selective control of the substance density and homogeneity thereof.

To produce a ceramic substance 100 for a ceramic material 100', it is proposed to convert at least one starting substance 10 in the form of a homogeneous powder having a fiber length distribution $D_{50}$ below 15 µm with at least one binder 20 in a form of a powder into a homogeneous mixed powder 30 by compacting the homogeneous mixture under an action of pressure S2 so as to form therefrom the desired carbon substance by a corresponding shaping process S3.

Reference will now be made to the drawings in detail.

FIG. 1A shows a schematic flow diagram illustrating an embodiment of the method according to the invention for producing a ceramic substance 100 for a ceramic material 100'.

After an introductory processing step S0, the starting substance 10 and one or more additions, in particular a binder 20 and possibly also further additives or fillers, are provided in steps S1a and S1b in the provision step S1. Steps S1a and S1b can be carried out one after the other or parallel to one another.

In the subsequent step S2, the provided starting substances, namely the starting substance 10 and the one or more additions 20, are combined in a mixing or intensive mixing process under the action of pressure to obtain a compacted homogeneous mixture.

An intermediate processing step Z may then optionally follow.

Next, the carbon substance is formed in step S3, more specifically as a result of thermal treatment to carbonize, or to carbonize and graphitize, the compacted homogeneous mixture.

After step S3, a further processing step W may follow, within the scope of which the substance resulting from the molding step S3 is processed further.

The production method according to the invention ends in step S4 with the siliconization of the carbon substance.

Figure 1B:
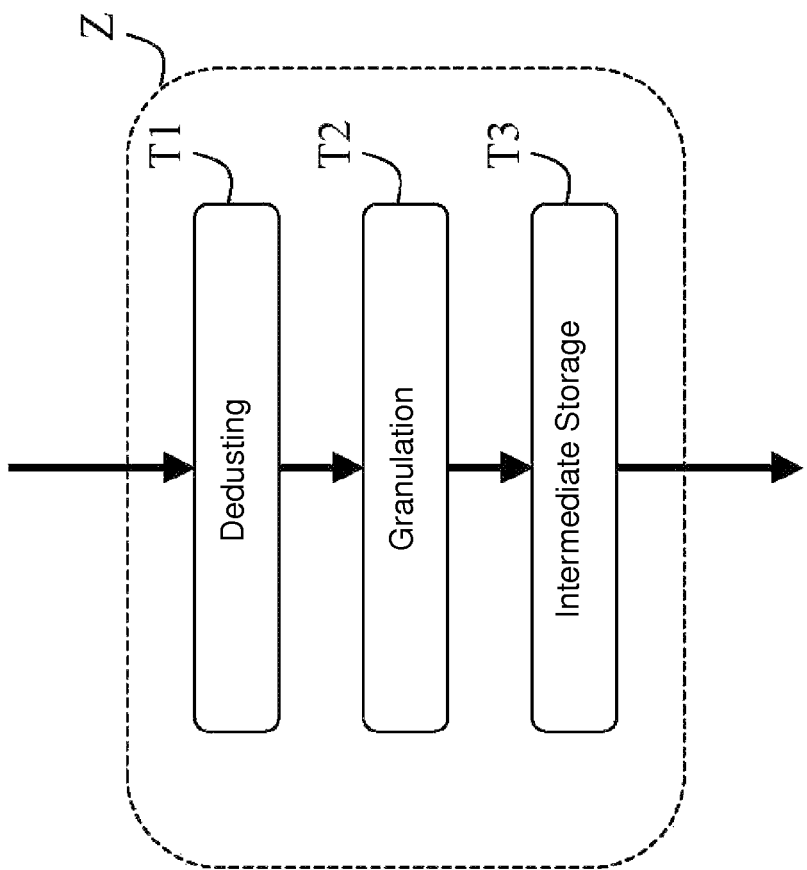

According to FIG. 1B, the intermediate processing step Z may include one or more processes of dedusting T1, granulation T2 and/or intermediate storage T3 in one embodiment of the production method according to the invention. The procedure and the advantages of these intermediate steps have already been explained within the scope of the general description of the invention.

Figure 1C:
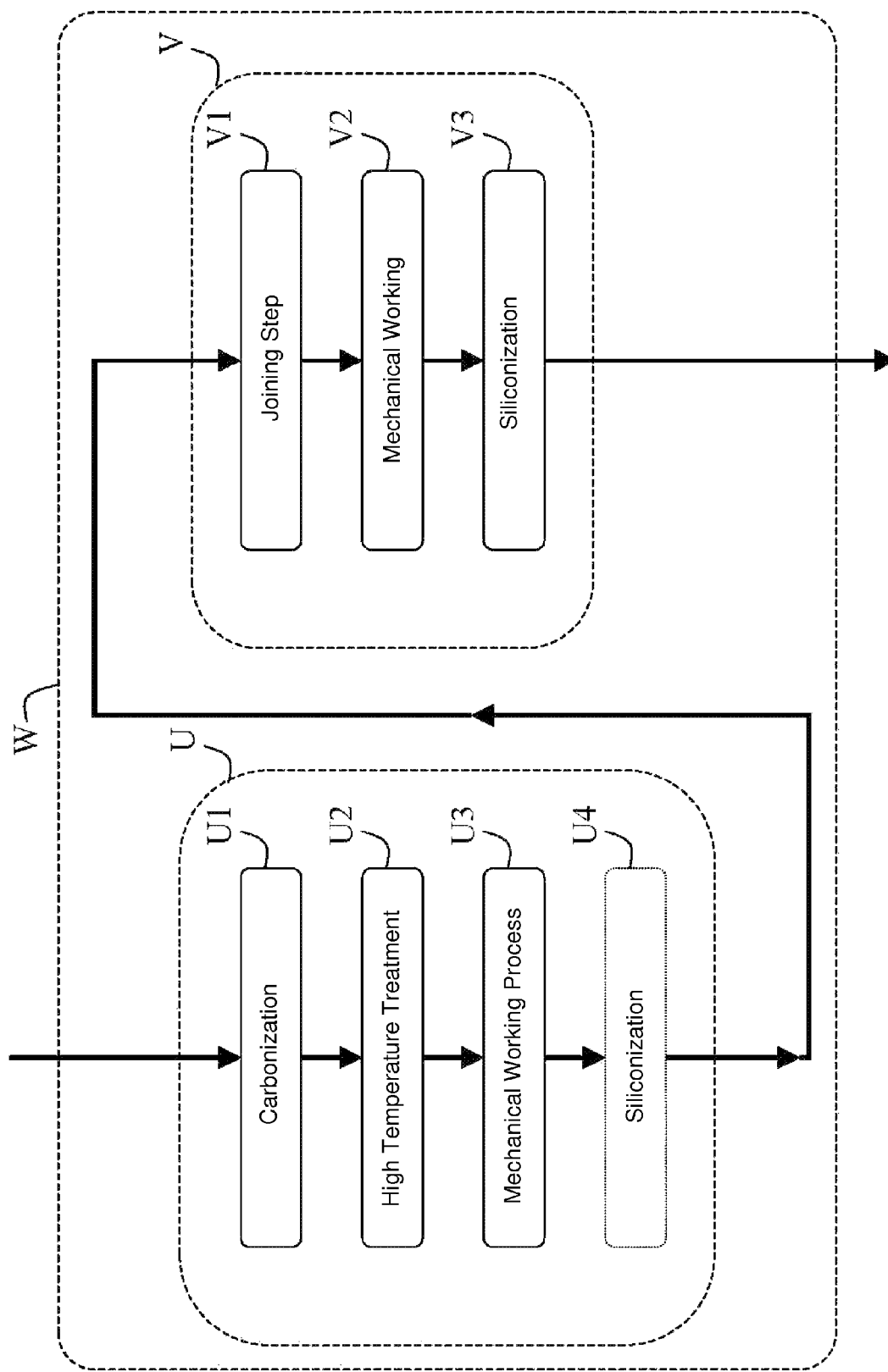

According to FIG. 1C, the step of further processing W may include the further treatment and refining U of the obtained ceramic substance 100 as well as a final further processing step V, which ultimately delivers from the obtained ceramic substance 100 a ceramic material 100' that is ready for production.

The actual further processing and refining portion U includes steps of carbonization U1, high-temperature treatment U2, possibly a mechanical working process U3 and possibly siliconization U4.

The mechanical working U3 and siliconization U4 may be optional at this point if the intermediate product obtained after compression has the correct shape and/or premature siliconization would impede further working. In accordance with the further processing and refining portion U4, plates can thus be provided as intermediate products containing the ceramic substance 100 according to the invention.

During the actual further processing step V, intermediate products thus produced, for example plates or the like, can then be joined together in a first step V1. This is achieved, for example, by gluing or by pressing the products together, possibly with interspersion of powder from the same substance class as the carbon substance according to the invention for the plates or intermediate products. As a result of the joining process V1, an encasing body is provided, from which the actual product can then be worked, possibly by mechanical working V2, the actual product then being formed, possibly by siliconization V3, with corresponding mechanical properties via silicon uptake in the structure.

FIGS. 2A-2H shows an improved illustration again of intermediate stages A to H, which are achieved in one embodiment of the method according to the invention for producing a ceramic substance 100 for a ceramic material.

According to the intermediate state A in FIG. 2A, the starting substance 10 and a powdery and carbonizable binder 20 are first provided in homogeneous form, wherein corresponding criteria are to stipulated for the fiber length distributions; this concerns the starting substance 10, but also the binder 10 in particular.

According to the intermediate state shown in FIG. 2B, the starting substance 10 and the additions 20 are mixed intensively in a vessel 40 by a mixer 41.

The homogenous mixture 30 according to the intermediate state in FIG. 2C is produced as an intermediate product.

The homogeneous mixture 30 is then filled, according to FIG. 2D, into the vessel 42 of a compression device 42, 43 and, in accordance with the intermediate state in FIG. 2E, is subjected to a pressure p, the compressive force, by a plunger 43, in this case from one side.

During the transition to the state in FIG. 2F, the homogeneous mixture 30 is thus compacted under the pressure p into the shape of the vessel 42 by the action of the plunger 43, such that, in accordance with FIG. 2G, the preliminary product 50 for the ceramic substance 100 according to the invention is produced. The ceramic substance is then produced by an intermediate processing step by carbonization and/or siliconization, FIG. 2H.

Figure 4:
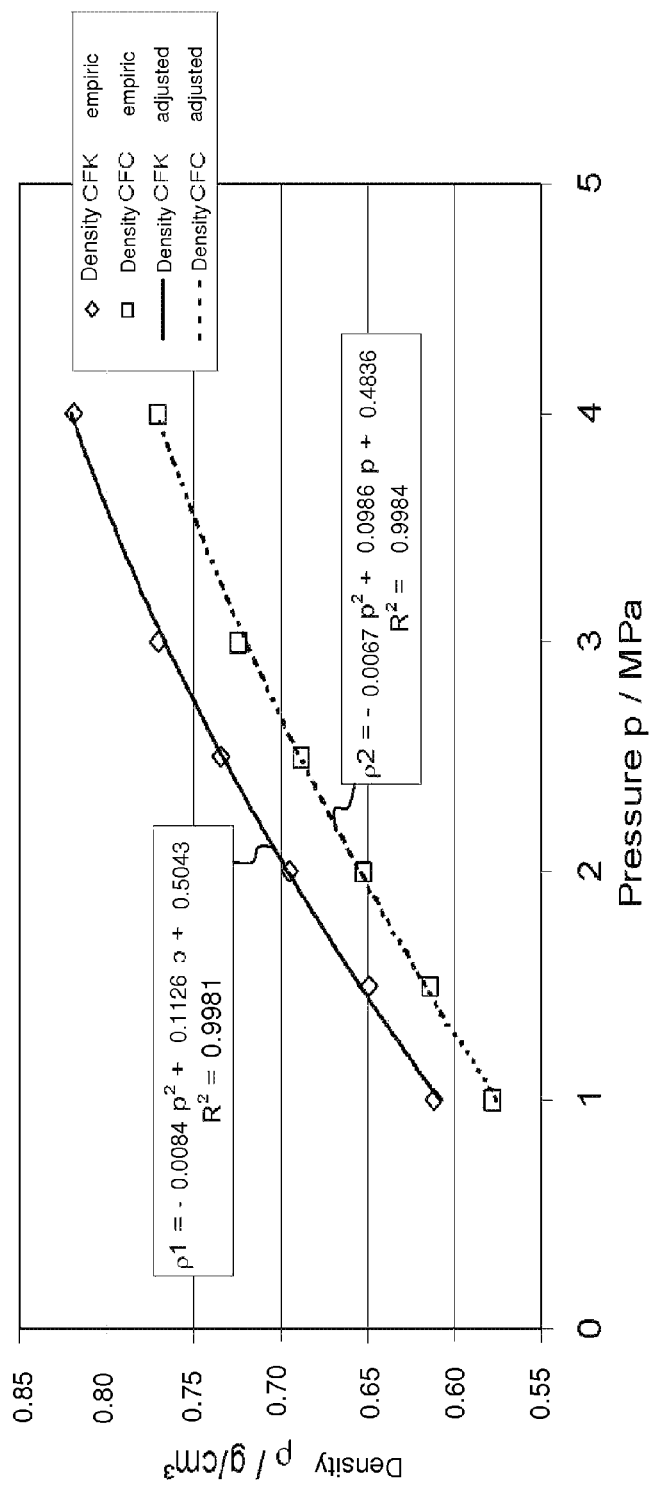
FIG. 4 is a graph showing how in one embodiment of the method according to the invention for producing the ceramic substance for the ceramic material, the density of the carbon substance according to the invention can be set by pressure during the shaping process.

FIGS. 3 and 4, in the form of a Table 1 and a Graph 1 respectively, show the relationship between the compressive force p during compaction of the homogeneous mixture 30 and the density ρ of the ceramic substance 100, in particular after carbonization, in one embodiment of the method according to the invention.

Two series of empirical measurements at pressures between 1.0 MPa and 4.0 MPa are shown in Table 1 in FIG. 3, the data of these series of measurements being shown in the graph by squares and by diamonds. A more detailed analysis reveals that the densities $\rho_1$ and $\rho_2$ of the series of measurements in the pressure ranges used can be described in each case by a polynomial of second degree.

The numerical values in Table 1, the information from Graph 1 and the functional relationships from the fitting curves for $\rho_1$ and $\rho_2$ can be used for the control of the density $\rho$ by the compressive force p, as has already been described above in detail.

Figure 6:
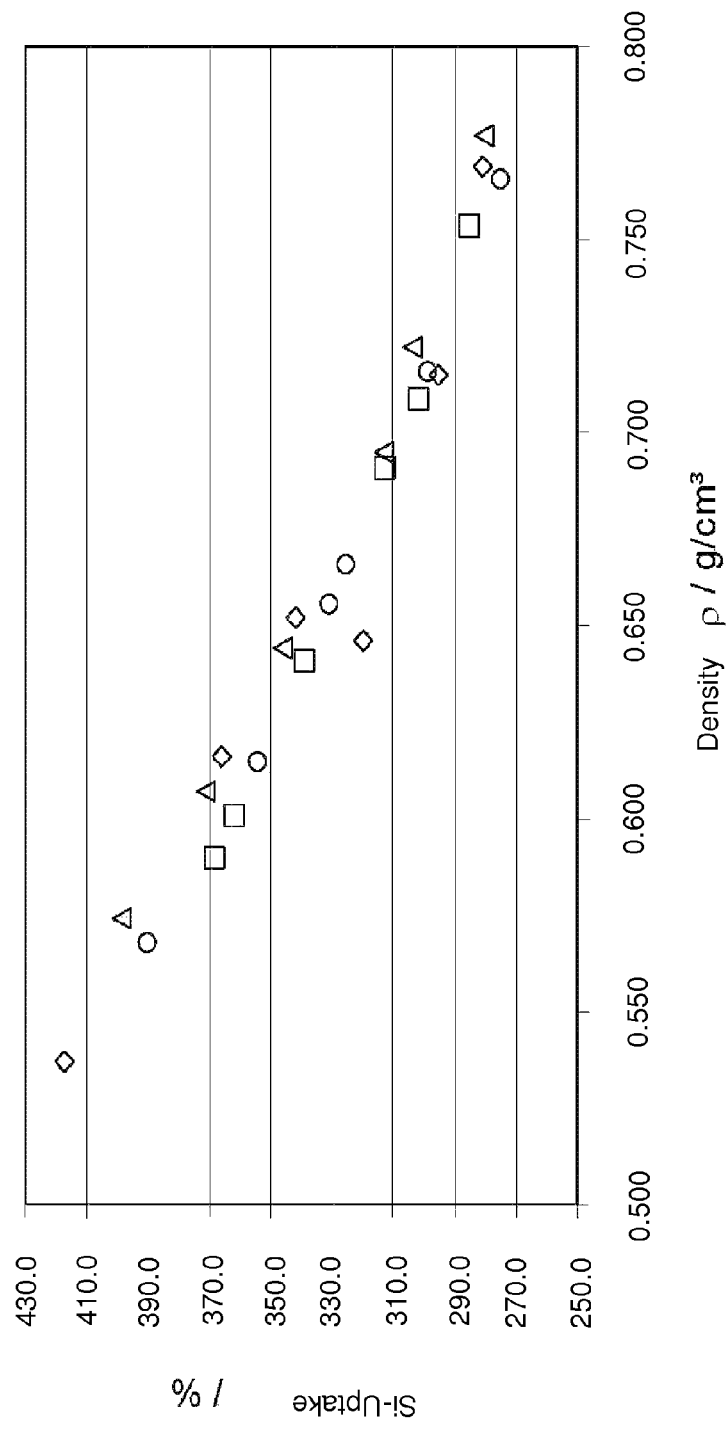
FIG. 6 is a graph showing how the uptake of silicon during the process of siliconization, in one embodiment of the method according to the invention for producing the ceramic substance for the ceramic material, can be controlled via the density of the preliminary product of the ceramic substance.

FIGS. 5 and 6, with Table 2 and Graph 2 respectively, describe the silicon uptake in one embodiment of the method according to the invention after carbonization as a function of the density of the carbon substance before siliconization.

Table 2 in FIG. 5 shows four series of empirical measurements, which are represented in Graph 2 in FIG. 6 by diamonds, circles, triangles and squares.

Again, the numerical information from Table 2 and the information from Graph 2 can be used for the control of the silicon uptake by density in the carbon substance according to the invention after carbonization.

It is also conceivable that a fitting curve, for example in the form of a polynomial expression, is established on the basis of the data in Table 2, of which the parameters can then be used directly for the control of the relationship between silicon uptake and density in the production process.

Figure 8:
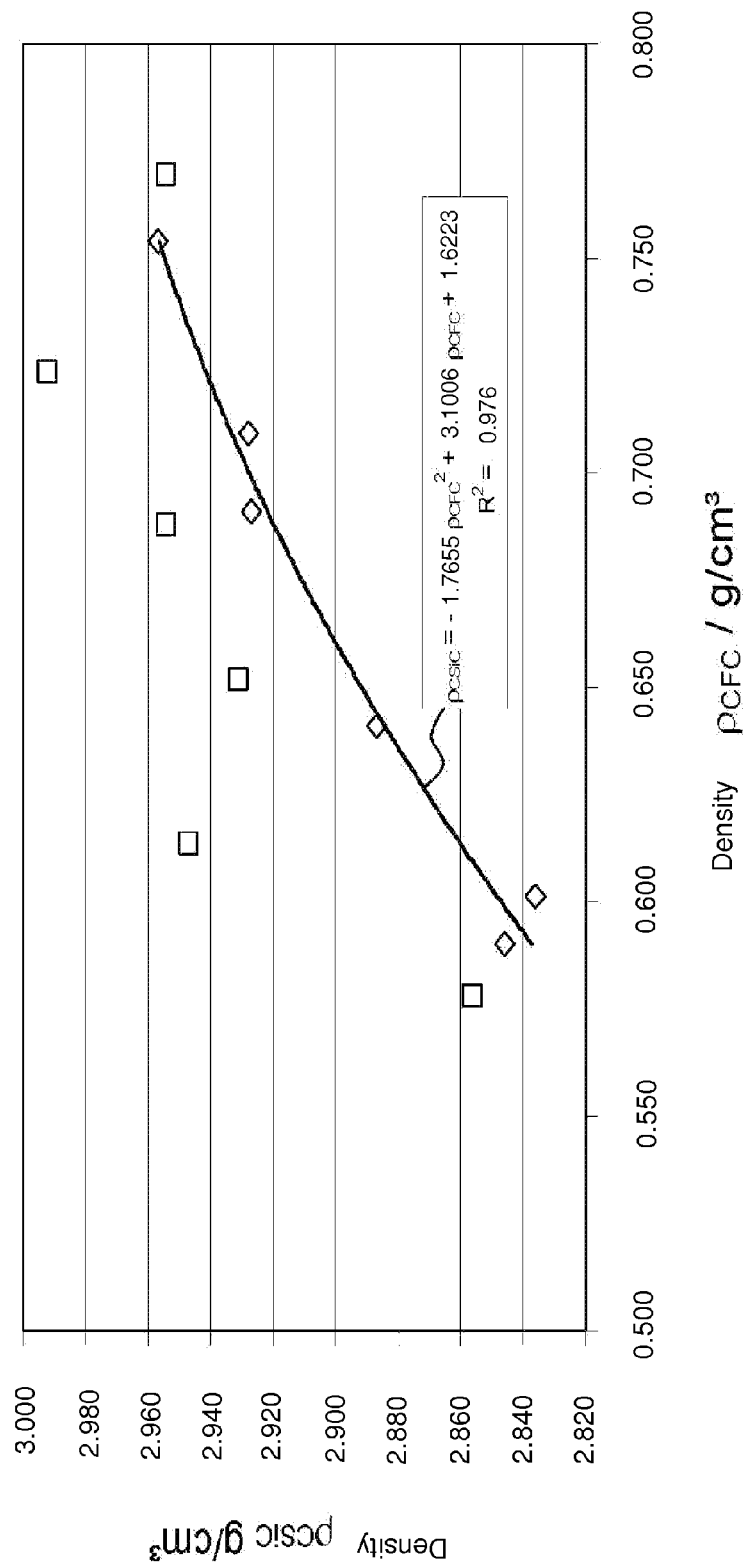
FIG. 8 is a graph showing how in one embodiment of the method according to the invention for producing the ceramic substance for the ceramic material, the density of a ceramic substance according to the invention or of a preliminary product thereof can be controlled, following a process of siliconization, via the density of the unsiliconized form of the carbon substance or of the preliminary product.

Table 3 and Graph 3 in FIGS. 7 and 8 respectively describe the density of a CSiC substance, that is to say of a carbon-fiber-reinforced silicon carbide, as a function of the density of the CFC substance, that is to say of the carbon substance according to the invention after compression and possibly after carbonization.

From the relationships in Table 3 in FIG. 7 and in Graph 3 in FIG. 8, it is possible to control the silicon uptake during siliconization by the density of the carbon substance according to the invention or of the preliminary product, and therefore by the corresponding compressive force and the intermixed components and particle size thereof. In this case too, the numerical values in Table 3, the Graph in FIG. 8 and in particular the parameters of the numerical fitting, in this case again in the form of a polynomial of second degree, can be used.

Figure 10:
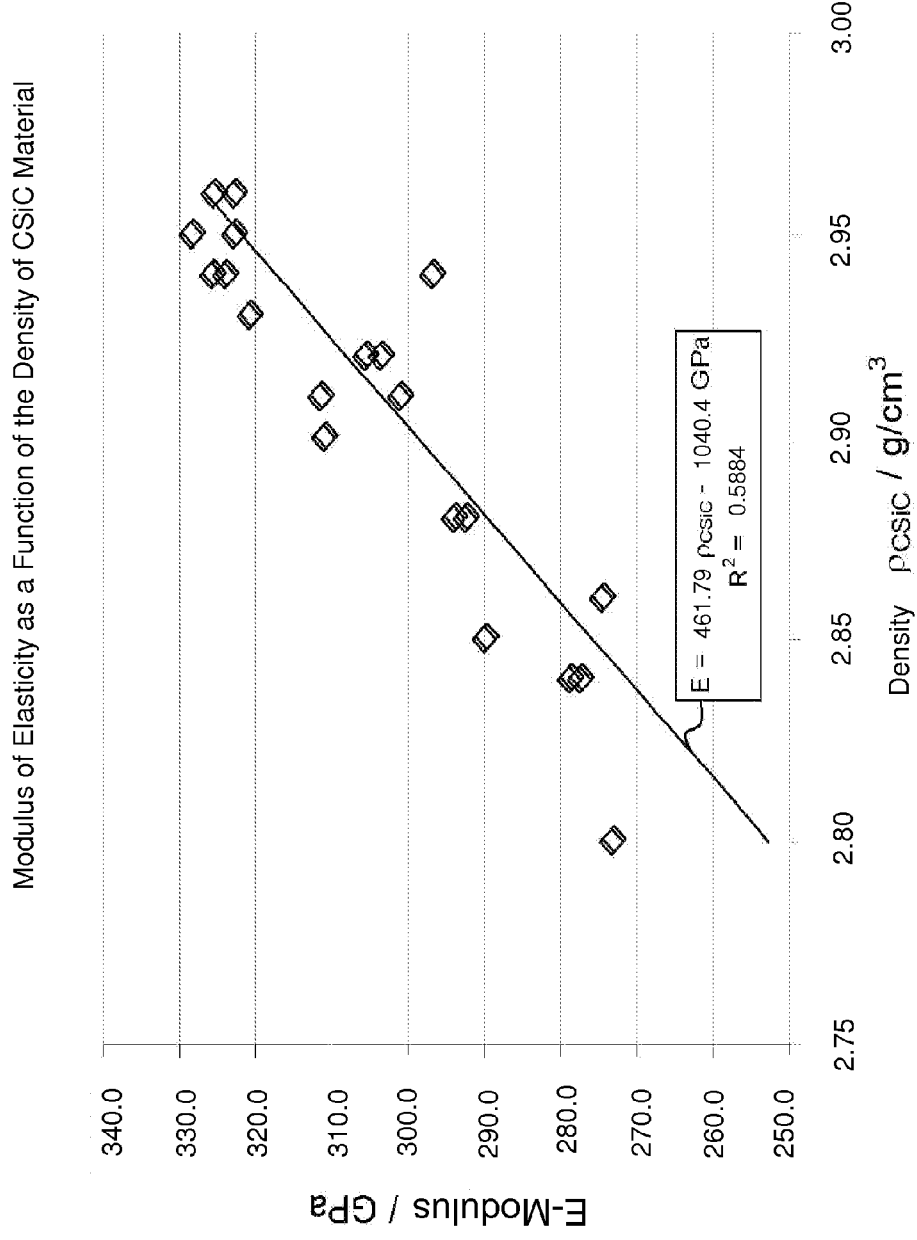
FIG. 10 is a graph showing how, in one embodiment of the method according to the invention for producing the ceramic substance for the ceramic material, the modulus of elasticity of one embodiment of the ceramic substance according to the invention or of the preliminary product thereof can be controlled via the density of the siliconized form of the carbon substance or the precursor thereof.

Table 4 and Graph 4 from FIGS. 9 and 10 respectively show how the modulus of elasticity E of the ceramic substance 100 according to the invention can be controlled by the density of the underlying siliconized substance.

A series of measurements for a carbon-fiber-reinforced silicon carbide is shown in Table 4 in FIG. 9. Different carbon-fiber-reinforced silicon carbide substances having different densities have been produced, and the modulus of elasticity has been determined in each case.

The measurement results are illustrated in the Table and in Graph 4 in FIG. 10, wherein a linear relationship is basically produced in the considered density range. In this case too, the numerical values in Table 4 from FIG. 9, the information contained in Graph 4 from FIG. 10 and, lastly, the numerical parameters from the fitting curve can be used to control the properties, in particular the modulus of elasticity, of the ceramic substance 100 according to the invention or the preliminary product 50 thereof.

On the whole, it is found that a large part of the physical, mechanical, but also thermal and electrical properties for the ceramic substance 100 according to the invention or the preliminary product 50 thereof can be set in a controlled manner in accordance with the invention by the density and their homogeneity after the shaping process, wherein the type of starting substances, specifically the carbon-based or carbon-fiber-based or carbon-fiber-reinforced starting substance 10 and the binder 20, and the fiber length distribution thereof, are also of significance however.

LIST OF REFERENCE SIGNS 10 starting substance
20 addition, additive, binder, filler
30 mixed powder, mixture
30' granulate
40 vessel, mixing vessel
41 mixer
42 vessel, compression mould
43 plunger
50 preliminary product of the ceramic substance according to the invention
100 homogeneous ceramic substance according to the invention
100' material
p pressure, compressive force

The invention claimed is:

1. A method for producing a ceramic substance, which comprises the following steps of:
producing a homogeneous mixture containing carbon fibers having a fiber length distribution $D_{50}$<15 µm and at least one powdery and carbonizable binder;
compacting the homogeneous mixture under an action of pressure resulting in a compacted homogeneous mixture;
thermally treating to at least one of carbonize or carbonize and graphitize, the compacted homogeneous mixture to obtain a carbon substance; and
siliconizing the carbon substance to obtain the ceramic substance.

2. The method according to claim 1, wherein the carbon fibers have the fiber length distribution of $D_{95}$<30 µm.

3. The method according to claim 1, wherein the powdery and carbonizable binder contains a powdery resin.

4. The method according to claim 3, wherein the powdery and carbonizable binder contains a powdery phenolic resin.

5. The method according to claim 1, wherein the powdery and carbonizable binder has a particle size distribution $D_{50}$<100 µm.

6. The method according to claim 1, which further comprises selecting at least one of a mixing ratio in the homogeneous mixture, the pressure during the compacting step, or a temperature during the thermal treatment, such that the carbon substance has a density in a range of approximately 0.5 g/cm$^3$ to approximately 0.85 g/cm$^3$.

7. The method according to claim 1, which further comprises forming a density of the ceramic substance in a range from approximately 2.8 g/cm$^3$ to approximately 3.1 g/cm$^3$ during siliconization.

8. The method according to claim 1, wherein the homogeneous mixture contains 20-50% by weight of the at least one powdery and carbonizable binder and 50-80% by weight the carbon fibers.

9. The method according to claim 1, which further comprises providing and setting a compressive force in a range from approximately 1.0 MPa to approximately 4.0 MPa during the compacting step.

10. The method according to claim 1, which further comprises molding the homogeneous mixture in a mold to form a compression molding during the compacting step and the compression molding is converted in the thermal treatment step into a molded article made of the carbon substance.

11. The method according to claim 10, which further comprises curing the compression molding before carbonization.

12. The method according to claim 10, which further comprises producing a plurality of molded articles made from the carbon substance, which are joined together, before the siliconizing step, by means of a carbonizable adhesive, to obtain a molded article arrangement.

13. The method according to claim 12, wherein the carbonizable adhesive contains a phenolic resin and a silicon carbide powder.

14. The method according to claim 13, wherein the silicon carbide powder has a mean particle diameter of 1-50 µm.

15. The method according to claim 13, wherein the carbonizable adhesive contains 5-50% by weight water, 20-80% by weight silicon carbide powder and 10-55% by weight resin.

16. The method according to claim 13, wherein the carbonizable adhesive contains less than 11% by weight of a filler made of the carbon substance.

17. The method according to claim 12, wherein the molded article arrangement is worked by removal of the carbon substance from the molded article arrangement before the siliconizing step, such that a preform made of the carbon substance with a predefined shape is produced.

18. The method according to claim 17, wherein the preform is carbonized before siliconization.

19. The method according to claim 1, wherein the carbon fibers are produced by grinding and carbonizing at least one of viscous fibers or cellulose fibers.

20. The method according to claim 1, wherein the homogeneous mixture contains 30-40% by weight the at least one powdery and carbonizable binder and 60-75% by weight the carbon fibers.

* * * * *